April 12, 1960 R. H. CURTIS 2,932,604
APPARATUS AND METHOD FOR MAKING FIBROUS TUBULAR BODIES
Filed July 29, 1949 3 Sheets-Sheet 2
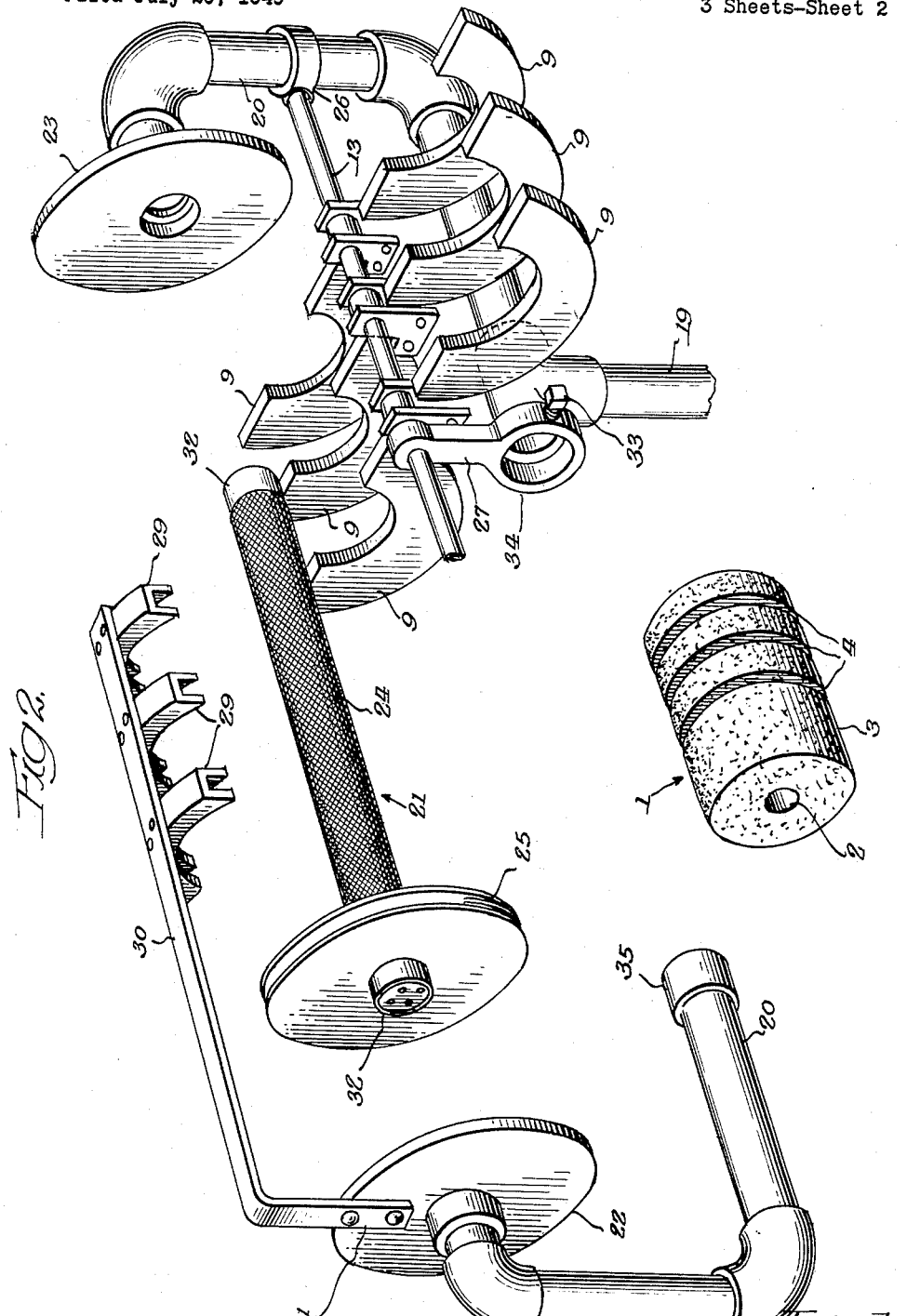

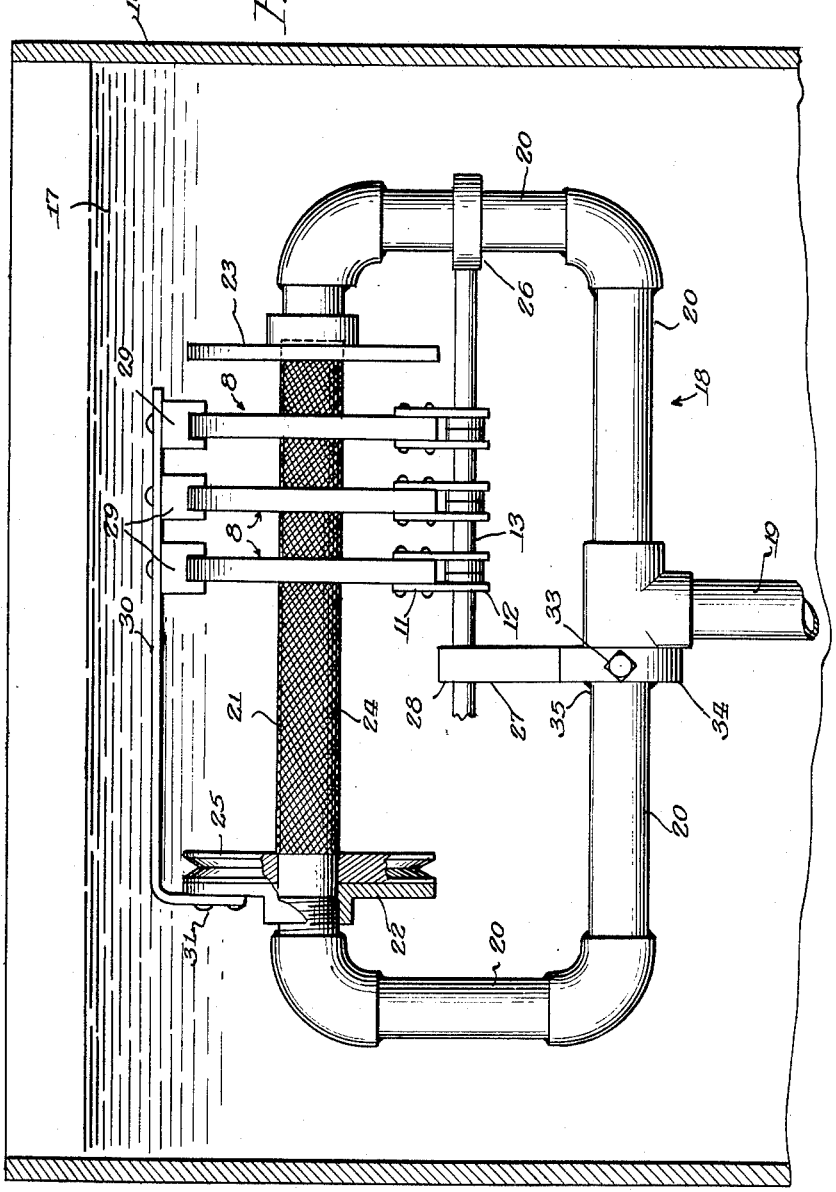

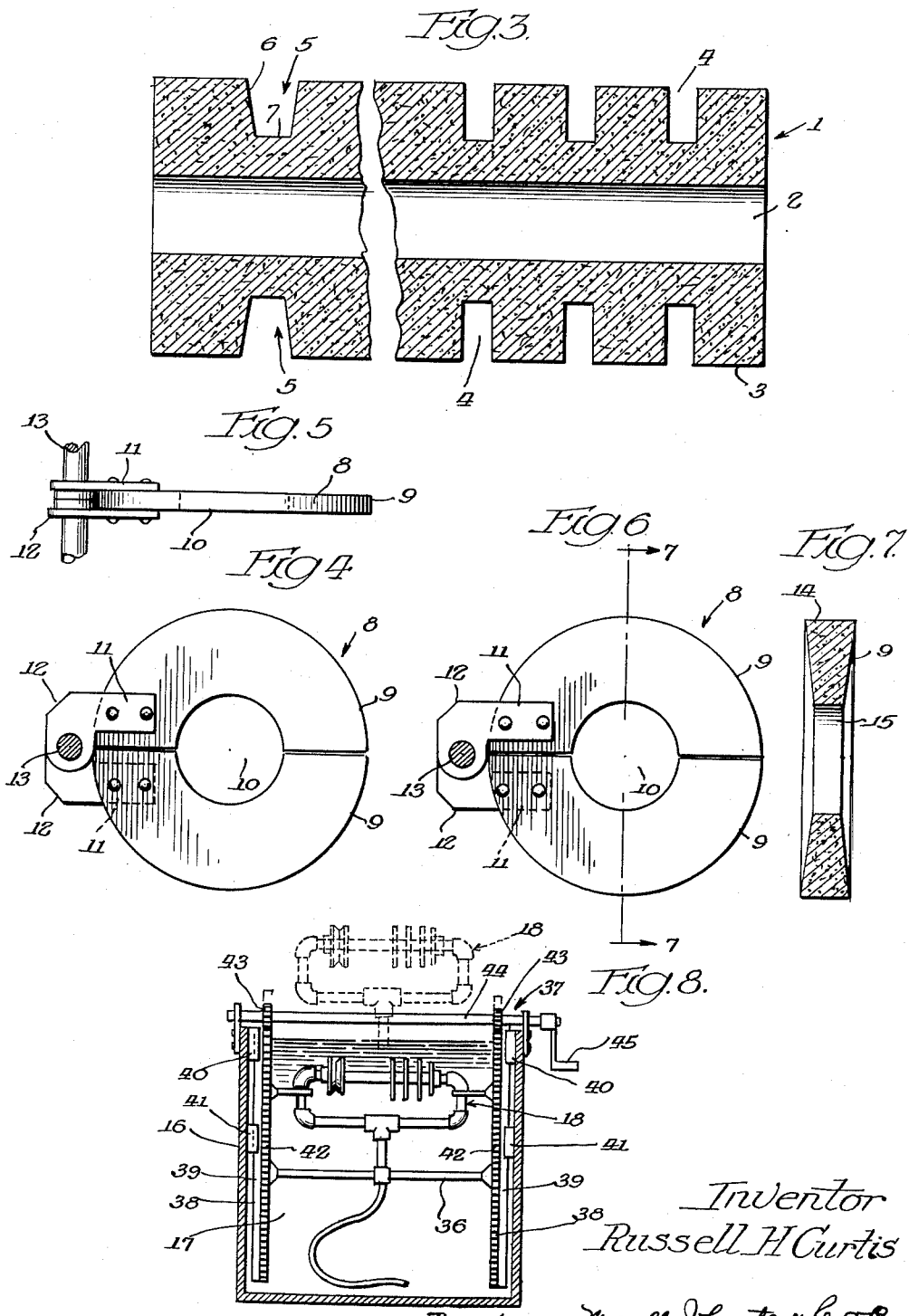

United States Patent Office 2,932,604
Patented Apr. 12, 1960

2,932,604

APPARATUS AND METHOD FOR MAKING FIBROUS TUBULAR BODIES

Russell H. Curtis, St. Charles, Ill., assignor to Hawley Products Company, St. Charles, Ill., a corporation of Delaware Application July 29, 1949, Serial No. 107,422

4 Claims. (Cl. 162—228)

This invention relates to filter members for use in liquid systems and more particularly to a molded fibrous filter element and a method and apparatus for making it.

One object of the present invention is to provide a filter element having a large filtering surface area and a large entrapping area for solid particles.

Another object of the present invention is to provide a filter element of one piece molded fibrous construction.

Still another object is to provide a filter element of integral accreted fibrous construction.

A further object of the invention is to provide a filter element of uniform diameter.

A still further object is to provide a method for making filter elements of uniform diameter and shape by accreting fibers from an aqueous suspension of fibrous material.

Another object is to provide an apparatus especially adapted for the accreting of fibrous material onto a porous former in such manner that a uniform thickness of accreted fibers will be achieved.

These and other objects of the present invention will be more fully understood by referring to the accompanying disclosure and drawings in which:

Figure 1 represents a side elevation of one embodiment of the apparatus which may be employed in the practice of this invention;

Figure 2 is an exploded view of the apparatus of Figure 1 showing in greater detail the arrangement and structure of the parts;

Figure 3 is a cross-sectional view of a molded fibrous filter element made on the apparatus of Figures 1 and 2;

Figure 4 is a side view of one forming element of the apparatus of Figure 2;

Figure 5 is a plan view of the forming element shown in Figure 4;

Figure 6 is a side view of an alternative forming element to the element shown in Figures 4 and 5;

Figure 7 is a cross-sectional view taken along the lines 7—7 of Figure 6; and

Figure 8 represents a cross-sectional view showing the forming apparatus of Figures 1 and 2 and means for elevating and lowering the forming apparatus in a fiber-containing bath.

The herein described invention provides a novel apparatus and method for preparing a filter element having unusual properties for use in liquid systems. The filter element may be generally characterized as a one piece elongated annular body of integral fibrous material having a large entrapping area for solids within said body and a relatively large, preferably recessed, outer surface area.

With further reference to the drawings, in Figures 2 and 3 the molded accreted fibrous body 1 is shown as being tubular in form and having a hollow core 2 in the center thereof. The periphery of the tubular member 1 is shown at 3. Adjacent the periphery 3 of the filter element 1 and extending inwardly toward the center are a plurality of notches, recesses or grooves 4. The grooves 4 are shown generally as being of the same width near the center as they are at the periphery. As an alternative, grooves 5 having side walls 6 sloping to a bottom 7 are shown in the broken away left hand portion of Figure 3. The wedge-shaped grooves 5 provide and increased surface area which results in greater efficiency during the filtering operation.

The grooves 4 in the filter element 1 of Figures 2 and 3 are made during the accreting process by employing the forming element 8 shown in Figure 4. The forming element 8 is composed of a pair of semi-circular segments 9, 9 adapted to contact one another to form a ring having a hollow center 10. The segments are joined through the riveted brackets 11, 11 to the hinge members 12, 12 which are pivoted on the shaft 13. The segments may be rotated about the pivot 13 to allow removal of the accreted article. Figure 5 is a plan view of the forming element shown generally in Figure 4.

Figures 6 and 7 represent a modification of the forming member 8 of Figures 4 and 5 in which like numerals represent like parts except that the members 9, 9 are tapered toward a central opening 15, as shown in Figure 7. The taper results in a groove or recess in the finished filter element like groove 5 in Figure 3.

As shown in Figure 1, the apparatus 18 is immersed in a suspension 17 of fibrous material contained in an open tank 16.

The apparatus 18 comprises an inlet pipe 19 for applying suction through the conduits 20, 20 to a foraminous former 21 which is mounted freely and horizontally for rotation between the flanged supporting elements 22 and 23. The foraminous former 21 consists of a tube having a number of holes therein and a porous screen 24 surrounding and covering the perforated tube. The foraminous tubular former 21 is adapted for rotation between the support members 22 and 23 by means of the driving pulley 25 which is fixed to the former 21. Another type of driving means may be substituted for pulley 21. An external driving means (not shown) is employed for driving the pulley 25.

If desired, the annular fibrous filter element may be deposited directly upon the foraminous tubular former 21 without further addition to the apparatus. The resultant filter will have a cylindrical outer surface substantially uniform in diameter and free from grooves.

As a preferred embodiment of the apparatus, however, the forming elements 8 are employed corresponding to Figures 4 and 5 or 6 and 7 of the drawings and resulting in the grooved filters shown in Figures 2 and 3. A plurality of the groove forming elements 9 are pivotally secured about the shaft 13 as shown in Figure 1. The shaft 13, only partially shown in Figure 1, may extend from the ring support member 26, which is secured to the conduit 20, through the support member 27. The support member 27 is adapted to receive the shaft 13 at the opening 28. It is contemplated that any suitable number of grooving elements 9 may be attached to the shaft 13 to provide any desired number of grooves in the finished product.

The grooving elements 9 are held in place in circular form by the grooved support members 29 which are attached to a rod 30 connected at 31 with the flange member 22. It is contemplated that the support members 29 may be supported in any other suitable manner as, for instance, on a support attached to the member 23.

Figure 2 illustrates the dissembled relationship of the apparatus parts. It will be noted that when the parts are assembled the ends 32, 32 of the forming member 21 fit into the central openings in the members 22 and 23. The apparatus is conveniently broken apart by unloosening the set screw 33 in the ring member 34 which allows easy separation of the conduit flange 35. When the conduit flange 35 has been disengaged from its support ring 34 the top support member 30 is raised slightly to disengage the clasp members 29 from the grooving elements 9. With the removal of the clasps 29 the grooving elements 9 may be opened about the shaft 13 into the position shown in Figure 2 so that the ends 32, 32 of the tubular member 21 may be lifted from the support members 22 and 23.

To reassemble the apparatus, the ends 32, 32 of the former 21 are reinserted into their supporting members 22 and 23, the grooving elements 9 are moved into circular engagement and are clasped in such position by the clamp members 29. At the same time, the end of the conduit member 35 is reinserted into its receiving ring 34. The set screw 33 is then tightened to secure the end 35 in place.

The apparatus is now ready for operation and is immersed in a bath of fibrous materials 17 as shown in Figures 1 and 8. Suction is applied through the conduits 19 and 20 to the opposite ends 32, 32 of the foraminous former 21. The former 21 is set in horizontal rotation by means of an exterior drive (not shown) connected to the pulley 25. In this manner a layer of accreted fibrous material of uniform thickness is deposited around the rotating foraminous member 21. The density will usually vary, the finer fibers tending to deposit near the screen 24. Thus, the density will be greater near the interior and less near the exterior of the filter element. This is an inherent characteristic of accretions of this kind When a fibrous layer of desired thickness has been deposited on the rotating foraminous former 21, the suction may be discontinued. The drive means (not shown) for the rotating pulley 25 is disconnected, and the entire device may be raised from the bath by any suitable device such as that shown generally in Figure 8.

As a preferred alternative the whole apparatus is raised from the bath after a suitable layer has been accreted, and the suction is continued thereby to draw air through the accreted layer until the moisture content has been substantially reduced. Then the suction is discontinued, and the apparatus is broken apart at the end 35 and the clamp members 29 are removed from the grooving elements 9 allowing the grooving elements 9 to open about the shaft 13. The foraminous former 21 may be lifted from its supports 22, 23 and the accreted member 1 may be removed from the forming screen 24. Alternatively, the screen 24 may be removable from the perforated tube of the former 21 and may be removed with and allowed to remain in the body of the filter element 1. The accreted member may be suitably dried in an oven or by drawing hot air therethrough. Thereafter, if desired, the accreted member may be trimmed or sized. As another alternative, the screen 24 may form the central part of a spool on which the fibers are deposited. The ends of the spool would enclose the ends of the body 1 of the filter. The spool with the fibers deposited thereon may be removed from the perforated tube of the former 21 as a unit and used as such, with or without further processing.

Figure 8 is a general view of a tank 16 filled with fibrous slurry 17 and having immersed therein the forming apparatus 18. The apparatus is supported on a movable table or platform 36 which is adapted for removal from the bath by raising on the geared elevator 37. The table 36 is secured on opposite sides to racks 38, 38 having guide rails 39, 39 vertically slidable in guides 40, 40 and 41, 41. The racks 38, 38 are provided with gear teeth 42, 42 engaging pinions 43, 43 mounted for rotation on the shaft 44. A crank 45 fixed to shaft 44 may be turned to cause the platform 36 to be raised and lowered. It will be understood that any elevating means may be employed, and only the simplest is shown herein for illustrative purposes.

The unusual result obtained by the use of the apparatus in the method disclosed herein is one which has heretofore been unknown in the art. It is well known in the art that accreting from a fibrous suspension onto a porous former will result in a build-up of deposited material at the bottom of the former. In other words, accretion occurs more rapidly at the lower extremity of a former than it does near the upper. The result is a tapered accreted member having a base of large dimensions and a top of smaller dimensions. It is now possible, by the practice of the present invention, to employ a horizontal former upon which may be deposited a uniform accreted layer of fibrous material in which the thickness remains substantially constant throughout. An article made upon the former disclosed in the present invention is not tapered and is of uniform dimensions at either extremity of the finished article.

A large number of fibrous materials are known and may be used in accordance with the present invention. For example, animal, vegetable, and mineral fibers, or any combination of them may be employed. Among the least expensive and most available fibers are cotton linters, wool fiber, wood fiber and grass fiber. Glass fibers or synthetic fibers (e.g., nylon) may be used when their special characteristics are required.

In some instances it may be desirable to add additional strength to the molded fibrous article by incorporating a resin with the fibrous material before accretion. A large number of resins are available for use in this manner, and it is contemplated that any one or a combination thereof may be employed. For example, the melamine type wet-strength resins, the phenol-formaldehyde resins and others of similar type have been found satisfactory.

The invention also provides a filter element having an unusually extensive surface area.

The invention is hereby claimed as follows:

1. A process of forming a one-piece tubular body of accreted fibrous material having indentations disposed circumferentially in the exterior surface of said body which comprises accreting fibers from a suspension of fibrous material in a liquid on to a tubular foraminous former rotating on a substantially horizontal axis in said suspension while exerting a partial vacuum within said former to form thereon a tubular body of accreted fibrous materials, and blocking off predetermined areas in spaced proximity to the exterior surface of said former by means of a plurality of blocking members which are fixed in spaced relation from each other longitudinally of the axis of rotation of said former and from the periphery thereof to accrete fibers on to said former in the space between said former and said blocking members and around said blocking members.

2. An apparatus for making a tubular filter body of accreted fibrous material which comprises a tubular foraminous former rotatably supported between tubular support members with its longitudinal axis horizontal, drive means for rotating said former about its longitudinal axis, a plurality of pairs of semicircular members, each pair mounted for rotation on a shaft at one end and adapted to meet at the other end, adapted to form a ring around said tubular former concentric therewith, clasp means for clasping each pair of said semicircular members at the periphery thereof to form said rings, support means for said clasp means, conduit means connected with said tubular support members for conducting reduced pressure to the interior of said former, and means for raising and lowering said aforementioned forming device in a liquid suspension of fibrous material.

3. An apparatus for forming a one-piece tubular body of accreted fibrous material having indentations disposed circumferentially in the exterior surface of said body which comprises a tubular foraminous former mounted for rotation about its longitudinal axis with said axis horizontal, means for supplying a liquid suspension of a fibrous material to the exterior surface of said former, means for rotating said former in said suspension, means for creating a partial vacuum within said former while it is rotating to cause an integral layer of fibrous material to be deposited thereon, and means around said former in proximity thereto but spaced therefrom for blocking off predetermined areas which come into contact with said deposited fibers to produce circumferentially disposed indentations in the resultant fibrous body during said rotation.

4. An apparatus for making a tubular body of accreted fibrous material having grooves circumferentially disposed in the exterior surface thereof which comprises a tubular foraminous former rotatably supported at opposite ends between hollow support members, means for reducing the pressure in said former, and a plurality of semi-circular hinged members mounted around said tubular former in concentric relation therewith and with their interior surfaces in proximity to but spaced a substantial distance from said tubular former, said hinged members being also spaced from each other axially with respect to the axis of rotation of said former.

References Cited in the file of this patent

UNITED STATES PATENTS

| | | |
|---|---|---|
| 208,792 | Burgess | Oct. 8, 1878 |
| 523,113 | Fairbanks et al. | July 17, 1894 |
| 557,197 | Fairbanks et al. | Mar. 31, 1896 |
| 1,008,228 | Weston | Nov. 7, 1911 |
| 1,161,747 | Stamets | Nov. 23, 1915 |
| 1,533,913 | Heymann | Apr. 14, 1925 |
| 1,805,499 | Schur | May 19, 1931 |
| 1,817,923 | Johnson | Aug. 11, 1931 |
| 1,952,168 | Hawley | Mar. 27, 1934 |
| 2,045,779 | Ikeda | June 30, 1936 |
| 2,081,740 | Farnham | May 25, 1937 |
| 2,204,276 | Lass | June 11, 1940 |
| 2,273,373 | Perry | Feb. 17, 1942 |
| 2,298,980 | Sloan et al. | Oct. 13, 1942 |
| 2,302,178 | Brennan | Nov. 17, 1942 |
| 2,383,066 | McDermott | Aug. 21, 1945 |
| 2,398,016 | Lemont et al. | Apr. 9, 1946 |
| 2,468,328 | Hill | Apr. 26, 1949 |
| 2,539,768 | Anderson | Jan. 30, 1951 |
| 2,551,175 | Smith | May 1, 1951 |
| 2,581,210 | Simpson | Jan. 1, 1952 |
| 2,651,417 | Malonowski | Sept. 8, 1953 |
| 2,670,851 | Curtis | Mar. 2, 1954 |